F. H. SHEPARD.
SYSTEM OF CONTROL.
APPLICATION FILED AUG. 30, 1916.
1,281,858.
Patented Oct. 15, 1918.
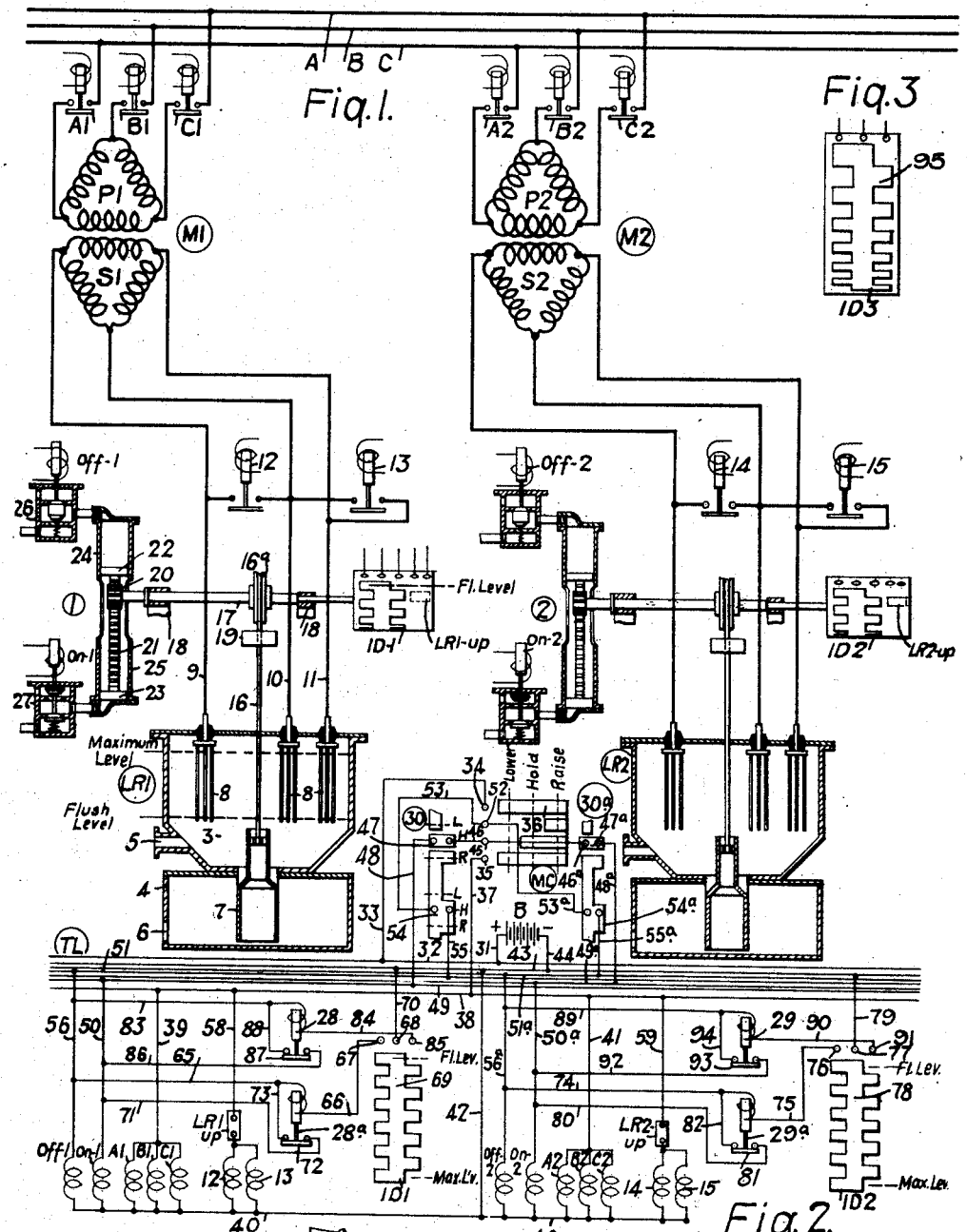
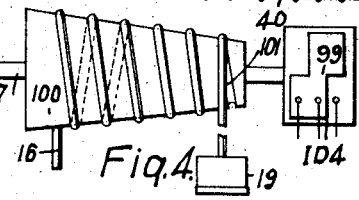
WITNESSES:
INVENTOR
Francis H. Shepard.
BY
ATTORNEY

UNITED STATES PATENT OFFICE.

FRANCIS H. SHEPARD, OF NEW ROCHELLE, NEW YORK, ASSIGNOR TO WESTINGHOUSE ELECTRIC AND MANUFACTURING COMPANY, A CORPORATION OF PENNSYLVANIA.

SYSTEM OF CONTROL.

1,281,858.   Specification of Letters Patent.   Patented Oct. 15, 1918.

Application filed August 30, 1916.  Serial No. 117,667.

*To all whom it may concern:*

Be it known that I, FRANCIS H. SHEPARD, a citizen of the United States, and a resident of New Rochelle, in the county of Westchester and State of New York, have invented a new and useful Improvement in Systems of Control, of which the following is a specification.

My invention relates to control systems for dynamo-electric machines and especially to the control of induction motors which are governed by means of liquid rheostats or the like.

In systems of the above-indicated character wherein electrically - controlled, fluid-pressure-actuated operating mechanisms are employed for the liquid rheostats, more or less trouble has been experienced in the operation of electric railway vehicles or locomotives which employ a plurality of such operating mechanisms by reason of the fact that the total effective fluid pressure and the friction of the moving parts vary considerably in the different mechanisms. Consequently, when the locomotive or vehicle operator attempts to effect a slight change in the liquid level in the various rheostats, some of the operating mechanisms move more rapidly than others and, therefore, do not identically vary the resistances of the circuits to be governed, as is desirable. After several such actions, it becomes necessary to individually balance the loads upon the several rheostats and motors by means of manually - operated balancing switches, as fully set forth and claimed in my co-pending application, Serial No. 784, filed Jan. 6, 1915.

One object of my invention is to obviate the above-mentioned difficulty by insuring that each rheostat-operating mechanism moves a predetermined increment whenever the master controller is temporarily moved to a certain position, as hereinafter more fully set forth.

Another object of my invention is to provide means for readily and inexpensively effecting variations in the size of the increments of movement, as desired during the operating range of each rheostat, although all rheostats are identically actuated in a predetermined step-by-step manner.

My invention may best be understood by reference to the accompanying drawing, wherein Figure 1 is a diagrammatic view of the main circuits of a system of control embodying my invention; Fig. 2 is a diagrammatic view of the auxiliary governing circuits for the system of Fig. 1; and Fig. 3 and Fig. 4 are diagrammatic views of modifications of certain portions of the system that is illustrated in Fig. 1.

Referring to Fig. 1, the system shown comprises a suitable three-phase system embodying a plurality of supply-circuit conductors A, B and C; a plurality of driving induction motors M1, M2 which are provided respectively with suitable primary windings P1 and P2 and secondary windings S1 and S2; a plurality of sets of primary switches A1, B1, C1 and A2, B2 and C2 for connecting the primary windings P1 and P2 to the respective supply-circuit conductors A, B, and C; a plurality of liquid rheostats LR1 and LR2 which are controlled by operating mechanisms 1 and 2, respectively, for governing the operation of the induction motors M1 and M2, as hereinafter more fully set forth.

Although, for the sake of simplicity and clearness, I have illustrated only two induction motors which may be disposed upon different cars of a multiple-unit train or upon different trucks of a single locomotive or other vehicle, it will be understood that the driving motors M1 and M2 are merely representative of any suitable driving member or driving unit and the arrangement of such driving units is immaterial to my present invention, with the exception that the driving members are normally mechanically independent of each other.

The liquid rheostats LR1 and LR2 are identical in construction and may be of any suitable type. Each rheostat comprises a suitable operating tank 3 and a reservoir 4 disposed below the tank, an inlet opening 5 to the tank 3 and an outlet opening 6 from the reservoir 4, which may communicate with any suitable liquid-circulating system (not shown); a combined discharge and regulating valve 7; and a plurality of suitably spaced electrodes 8 which are respectively connected to the terminals of the corresponding secondary induction motor winding by means of conductors 9, 10, and 11. The valve member 7 is adapted to permit the practically unrestricted flow of liquid from the inlet opening 5 to the reservoir 4 when occupying the illustrated position, and, when raised in the manner to be described, the level of the liquid in the operating tank 3 is correspondingly raised to gradually immerse the electrodes 8. The specific type of valve that is employed is immaterial to my present invention, but I prefer to use the valve that is fully set forth and claimed in a co-pending application of A. J. Hall, Serial No. 873,919, filed Nov. 25, 1914, and assigned to the Westinghouse Electric & Manufacturing Company.

Switches 12 and 13 are provided for short-circuiting the rheostat LR1 when a predetermined liquid level marked "Maximum level" is attained, and a similar function is performed by switches 14 and 15 with respect to the other liquid rheostat LR2.

The operating mechanism 1 comprises a suitable cable or rope 16 that is disposed around a pulley or sheave 16a which is secured to a shaft 17 mounted in suitable bearing members 18 and to the opposite ends of which an interlock drum ID1 and a pinion member 20 are attached. A suitable counterweight 19 is secured to the free end of the cable 16 for substantially counterbalancing the weight of the valve member 7, as will be understood.

The operating mechanism 2 comprises duplicates of those just described, as regards both structure and reference characters, except that the interlock drum is designated by the character ID2.

The operating mechanisms 1 and 2 severally comprise also a reciprocatory rack member 21 which is adapted to mesh with the pinion 20 and to the opposite ends of which pistons 22 and 23 are suitably secured to operate within cylinders 24 and 25. A pair of valves 26 and 27 which are, respectively, normally open and normally closed, are associated with the outer ends of the respective cylinders 24 and 25 to admit fluid pressure from any suitable source (not shown) to the cylinders, under predetermined conditions to be described.

The operation of the mechanisms 1 and 2, without regard to the specific electrical control thereof, may be set forth as follows: Since the valve 26 is normally open; that is, in communication with the source of fluid pressure (not shown), the pistons 22 and 23 are biased to their lowermost positions, as illustrated in the drawing. To effect an upward movement of the pistons, the two actuating coils On—1 and Off—1 of the operating mechanism 1, for example, are simultaneously energized, whereby fluid-pressure is admitted through the valve 27 to the lower cylinder 25 and is simultaneously exhausted to the atmosphere from the upper cylinder 24 through the closed valve 26. This reversal of normal fluid-pressure conditions effects the desired upward movement of the mechanism. To arrest such movement at any time, it is merely necessary to deënergize the off—1 actuating coil, whereupon fluid pressure is again admitted to the cylinder 24, and a positive and reliable stoppage of the mechanism is obtained by reason of the balanced-pressure conditions in the cylinders 24 and 25. To effect the return movement of the mechanism, the two actuating coils Off—1 and On—1 are deënergized, whereby fluid-pressure conditions revert to the original state and the mechanism is moved toward the illustrated position.

Referring to Fig. 2, the auxiliary governing system shown comprises, in addition to the actuating coils of the various switches and operating mechanisms that are shown in Fig. 1 and the contact members that are disposed upon the interlock drums ID1 and ID2, a master controller MC that is adapted to occupy a plurality of operating positions "Lower," "Hold" and "Raise," for correspondingly governing the operation of the several liquid rheostats, and, therefore, the several motors; a plurality of manually-operated, load-balancing switches 30 and 30a which are associated with the respective liquid rheostats in a manner to be described; a pair of relay devices 28 and 28a, which act in conjunction with the interlock drum ID1 and the master controller MC to effect predetermined movement of the valve member 7 of the liquid rheostat LR1 under certain operating conditions; a pair of similar relay devices 29 and 29a which are employed in conjunction with the interlock drum ID2 and the master controller MC to perform a similar function with respect to the liquid rheostat LR2, whereby both rheostats are identically operated, as set forth more fully later; a plurality of train-line conductors TL of a familiar type for suitably interconnecting the master controller and the various other auxiliary governing circuits; and a suitable source of energy, such as a battery B, for energizing the various actuating coils.

Assuming that it is desired to effect acceleration of the driving motors M1 and M2, the master controller MC may be actuated to its final position "Raise," whereby one circuit is established from the positive terminal of the battery B through conductor 31, train-line conductor 32, conductor 33, control fingers 34 and 35, which are bridged by a contact segment 36 of the master controller, conductor 37, train-line conductor 38, where the circuit divides, one branch including conductor 39, the parallel-related actuating coils of the switches A1, B1 and C1 and conductor 40, and the other branch including conductor 41, the parallel-related actuating coils of the switches A2, B2 and C2 and conductor 40, whence a common circuit is completed through conductor 42, train-line conductor 43 and conductor 44 to the negative terminal of the battery B.

The several primary switches are thus closed to connect the primary induction-motor windings P1 and P2 to the respective supply-circuit conductors.

A further auxiliary circuit is completed from the contact segment 36 of the master controller through control finger 45, where the circuit divides, one branch including conductor 46, contact member 47 of the switching device 30, conductor 48, train-line conductor 49, conductor 50 and the actuating coil On—1 of the valve 26 to the negative conductor 40, and the other branch including conductor 46a, contact member 47a of the switching device 30a, conductor 48a, train-line conductor 49a, conductor 50a and the actuating coil On—2 of the liquid rheostat LR2 to the negative conductor 40.

Another auxiliary circuit is also completed from the contact segment 36 of the master controller through control finger 52, where the circuit divides, one branch including conductor 53, contact member 54 of the switching device 30, conductor 55, train-line conductor 51, conductor 56 and the actuating coil Off—1 of the valve 27, and the other branch including conductor 53a, contact member 54a of the switching device 30a, conductor 55a, train-line conductor 51a, conductor 56a and the actuating coil Off—2 of the liquid rheostat LR2 to the negative conductor 40. Since both actuating coils of each of the operating mechanisms 1 and 2 are thus energized, an upward movement of the pistons 22 and 23 occurs, with a corresponding upward movement of the valve members 7, until a liquid level marked "Flush level", wherein the tips of the electrodes 8 are just immersed, is reached, when acceleration of the induction motors M1 and M2 will begin.

The further upward movement of the valve members 7, and the consequent rise of the liquid levels, may then be accomplished in any suitable manner to effect the desired rate of motor acceleration, since the movement of the valve members may be arrested at any time by merely actuating the master controller MC to its intermediate position "Hold", whereby the actuating coils Off—1 and Off—2 are deënergized, and balanced fluid-pressure conditions obtain in the several operating mechanisms 1 and 2 as previously set forth.

If the motors M1 and M2 are taking substantially equal divisions of the vehicle load, operation of the liquid rheostats to the maximum level may be effected in the manner just described. However, if, as is more or less usual, the motors do not equally divide the total load, by reason of unavoidable differences in the mechanical and electrical construction of the motors and of differences in the various driving wheel diameters, any desired variation of the load taken by either motor may be obtained by suitably manipulating the corresponding switching devices 30 or 30a, which perform the same function with respect to the individual liquid rheostats as does the actuation of the master controller MC to its intermediate position "Hold", namely, the deënergization of the corresponding "off" coil to arrest the operation of the rheostat or, of course, the energization of both the "on" and the "off" coils or their deënergization, if desired, in accordance with the movement of the switching devices 30 and 30a to the corresponding position R or L, standing for "Raise" and "Lower", respectively. The individual balancing action just recited is fully set forth and claimed in my above-identified co-pending application, and no further description is believed to be necessary here, inasmuch as such operation does not pertain directly to my present invention.

To effect equal increments of movement of the several valve members 7, the interlock drums ID1 and ID2, together with the corresponding relay devices 28, 28a, 29 and 29a are employed in conjunction with the temporary movement of the master controller from the "hold" position to the "raise" position. Such equal increments, which correspond to substantially equal variations of resistances in the secondary circuits of the several motors, are obtained in spite of the operating difficulties of differences in effective air pressures and frictions in the various operating mechanisms, as previously more fully set forth.

Assuming that a slight increase in the heights of the liquid in the several rheostats is desired, the master controller may be momentarily moved to its "raise" position and then may be returned to its "hold" position, whereupon the conductor 56, which is connected to the control finger 52 of the master controller, as hereinbefore described, is temporarily energized, and a circuit is completed therefrom through conductor 65, the actuating coil of the relay device 28a, conductor 66, control fingers 67 and 68, which are bridged by a portion of the contact segment 69 of the interlock drum ID1, conductor 70, train-line conductor 43 and conductor 44 to the negative battery terminal. Thus, the relay device 28a is raised to its upper or operative position, and a holding circuit therefor is completed from the conductor 50, which is energized from the control finger 45 in the "hold" position of the master controller, through conductor 71, the coöperating contact members 72 of the relay device 28a and conductor 73 to the actuating coil thereof. Thus, the relay device 28a is held in its closed position even though the master controller is immediately returned to its "hold" position, and such energization of the relay device is maintained until the contact segment 69 of the interlock drum ID1 breaks contact with the control finger 67.

It will be observed that the closure of the relay device 28a bridges the conductors 50 and 56 through conductors 71, coöperating contact members 72 of the relay device and conductors 73 and 65. Thus, energy is supplied to both the on—1 and off—1 actuating coils until the separation of the contact segment 69 and the control finger 67 of the interlock drum.

A similar action takes place in the rheostat LR2, since a circuit is completed from the conductor 56a which is connected to the control finger 52, through conductor 75, control fingers 76 and 77, which are bridged by a portion of the contact segment 78 of the interlock drum ID2, conductor 79 and trainline conductor 43. In this case, also, a holding circuit is formed, upon the closure of the relay device 29a, from the positively energized conductor 50a through conductor 80, coöperating contact members 81 of the relay device and conductor 82 to the actuating coil thereof. The closure of the relay device bridges the conductor 50a and 56a in a manner similar to that described in connection with the relay device 28a and, consequently, the actuating coils On—2 and Off—2 are energized until the contact segment 78 of the interlock drum ID2 breaks contact with the control finger 76. Provided the corresponding teeth or projections of the contact segments 69 and 78 of the interlock drums ID1 and ID2, respectively, are equal in length, it will be understood that the valve members 7 of both the liquid rheostats LR1 and LR2 are moved substantially equal increments.

Upon the next momentary action of the master controller MC to the "raised" position for the purpose of effecting a slight increase in the heights of the liquids, one circuit is completed from the conductor 56 through conductor 83, the actuating coil of the relay device 28, conductor 84 and control fingers 85 and 68, which are bridged by a succeeding portion of the contact segment 69 of the interlock drum ID1. A holding circuit is established, as soon as the relay device 28 has closed, from the conductor 50 through conductor 86, coöperating contact members 87 of the relay device 28 and conductor 88 to the actuating coil thereof; and, also, the conductors 50 and 56 are bridged by a circuit including conductors 86, coöperating contact members 87 of the relay device and conductors 88 and 83. Thus, the actuating coils On—1 and Off—1 are again energized until the contact segment 69 of the interlock drum ID1 becomes disengaged from the control finger 85.

Simultaneously, a second circuit is completed from the conductor 56a through conductor 89, the actuating coil of the relay device 29, conductor 90 and control fingers 91 and 77, which are bridged by a succeeding portion of the contact segment 78 of the interlock drum ID2. Upon the closure of the relay device 29, a holding circuit therefor is completed from the conductor 50a through conductor 92, coöperating contact members 93 of the relay device and conductor 94 to the actuating coil thereof. Also, the conductors 50a and 56a are bridged by a circuit including conductor 92, coöperating contact members 93 of the relay device and conductors 94 and 89. Thus, the actuating coils On—2 and Off—2 are energized until the contact segment 78 of the interlock drum ID2 breaks contact with the control finger 91, thereby insuring a movement of the valve member 7 corresponding to the liquid rheostat LR2 that is identical with the simultaneous movement of the other valve member 7.

Without further description, it will be understood that any desired increment of movement of the several valve members 7 may be simultaneously effected by the above-described manipulation of the master controller MC. Of course, if the master controller is allowed to remain in its raised position more than momentarily, the previously described normal operation of the rheostats will result. The contact segments 69 and 78 are, of course, identical in construction and, as illustrated in Fig. 2, the various teeth or side projections are of the same length throughout the range of operation of the interlock drum, which is shown as corresponding to the distance between flush level and maximum level of the liquid rheostat, as indicated by the legends.

However, if it is desired to vary the size of increment of movement during the range of operation of the interlock drums, this result may be readily accomplished by the use of a contact segment 95 of an interlock drum ID3 (Fig. 3), wherein the increment of movement gradually decreases in length as the interlock drum approaches its final position, or, in other words, the steps of operation of the liquid rheostat are smaller when the liquid level approaches its maximum height than is the case when the liquid level is near the bottom of the operating tank 3. Of course, the variation in the increments of movement is not limited to the type that is shown in Fig. 3, any other desired variation being readily obtained by suitably altering the configuration of the various contact segments 95 that are associated with the respective liquid rheostats.

When the liquid height marked "Maximum level" has been obtained, it is customary to close the short-circuiting switches 12, 13, 14 and 15, although such operation is not essential to my present invention. The short-circuiting action just recited is effected in the illustrated system by the completion of a circuit from the train-line conductor 38 through conductor 58, interlock or contact member LR1—up, which is disposed upon the interlock drum ID1 and because operative only when the position corresponding to maximum liquid level has been reached, (see Fig. 1), and the parallel-related actuating coils of the short-circuit switches 12 and 13 to the negative conductor 40. Similarly, a circuit is completed from the train-line conductor 38 to the conductor 59, interlock LR2—up, which is suitably disposed upon the interlock drum ID2, and the parallel-related actuating coils of the switches 14 and 15 to the negative conductor 40.

I have thus provided a system of the type under consideration whereby a plurality of liquid rheostats, which are operated by fluid-pressure actuating mechanisms, may be identically operated, irrespective of constructional or actuating differences in the respective operating mechanisms 1 and 2.

Reference may now be had to Fig. 4, which discloses another way of obtaining differences in the increments of movement during the range of operation of the liquid rheostats while maintaining the contact segment 99 of an interlock drum ID4 with two equally sized teeth, each corresponding to 180° degrees of travel. For the sake of simplicity and clearness, the interlock drum ID4 is shown developed into a single plane, although it will be understood that the contact segment 99 actually constitutes a continuous circumferential band.

The desired result may be accomplished by disposing a suitable number of convolutions of the valve-operating cable or rope 16 around a conically-shaped drum or pulley 100 which is mounted upon the same shaft 17 as the interlock drum and which may be provided with suitable grooves 101 for the reception of the cable convolution, as illustrated in Fig. 4. The counterweight 19 is located near the small end of the conically-shaped drum 100 while the valve member 7 (not shown) is associated with the other end of the cable 16 which is located near the larger end of the drum 100. Thus, as the interlock drum ID4 rotates with the conical drum, the effective length of travel of the valve member 7, with respect to equal 180° movements of the interlock drum ID1, is gradually decreased, in accordance with a well-known principle of mechanics.

Consequently, the length of movement of the valve members 7 may be varied during the range of operation thereof either by varying the relative size of the various teeth of the interlock drum contact segments or by using some device which embodies a mechanical principle similar to that set forth in Fig. 4, whereby the desired variation of increments may be automatically obtained.

I do not wish to be restricted to the specific structural details or arrangements of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a plurality of driving members, of independent means for severally governing the operation thereof, and means comprising contact members associated with the respective governing means and relays for insuring predetermined concurrent operation thereof under certain conditions.

2. In a system of control, the combination with a plurality of dynamo-electric machines, of means for normally independently governing the operation thereof, and means comprising contact members operable with the respective governing means and relays for effecting predetermined concurrent operation thereof under certain conditions.

3. In a system of control, the combination with a plurality of dynamo-electric machines, of resistance-varying means for normally independently governing the operation thereof, means for controlling said resistance-varying means, and means comprising automatically controlled contact members and electrically controlled relays for insuring predetermined concurrent operation of said controlling means under certain conditions.

4. In a system of control, the combination with a plurality of dynamo-electric machines, of resistance-varying means for normally independently governing the operation thereof, movable means for severally controlling said resistance-varying means, and means comprising contact members operable with the respective movable means and a plurality of relays for insuring predetermined concurrent operation of the movable means under certain conditions.

5. In a system of control, the combination with a plurality of dynamo-electric machines, of resistance-varying means for normally independently governing the operation thereof, movable means for severally controlling said resistance-varying means, a controlling device for effecting operation of all said machines automatically and at will, and means associated with said controlling device and the respective movable means for insuring predetermined concurrent operation of the movable means when the machines are operated at will.

6. In a system of control, the combination with a plurality of dynamo-electric machines, of resistance-varying means for normally independently governing the operation thereof, movable means for controlling said resistance-varying means, a controlling device for effecting operation of all said machines, and means severally electrically associated with said controlling device and mechanically operable with the respective movable means for varying the length of movement of the movable means during the range of operation thereof and for insuring predetermined concurrent operation thereof under certain conditions.

7. In a system of control, the combination with a plurality of dynamo-electric machines, of resistance-varying means for normally independently governing the operation thereof, movable means for controlling said resistance-varying means, a controlling device for effecting operation of all said machines, and plural means for insuring predetermined concurrent operation of the movable means under certain conditions, said plural means comprising a contact-carrying member operable with each movable means and switching means interposed between each contact-carrying member and said controlling device.

8. In a system of control, the combination with a plurality of dynamo-electric machines, of resistance-varying means for normally independently governing the operation thereof, electrically-controlled means for severally governing said resistance-varying means, a controlling device for effecting operation of all said machines, a plurality of contact-carrying members movable with the respective electrically-controlled means, and a plurality of switching devices adapted to be intermittently energized in accordance with the position of the corresponding contact-carrying member.

9. In a system of control, the combination with a plurality of dynamo-electric machines, of resistance-varying means for normally independently governing the operation thereof, electrically-controlled means for severally governing said resistance-varying means, a controlling device for effecting operation of all said machines, a plurality of contact-carrying members movable with the respective electrically-controlled means, a plurality of sets of switching devices corresponding to the contact-carrying members, the devices of each set being adapted for alternate energization in accordance with the position of the associated contact-carrying member, and coöperating contact members controlled by the respective switching devices for simultaneously energizing the several electrically-controlled means under predetermined conditions, whereby substantially identical operation of the several resistance-varying means is insured.

10. In a system of control, the combination with a plurality of driving induction motors of a plurality of liquid rheostats for normally independently governing the operation thereof, electrically-controlled means for severally governing said liquid rheostats, a master controller for effecting operation of all said motors, a plurality of contact-carrying members movable with the respective electrically-controlled means, a plurality of sets of switching devices corresponding to the contact-carrying members, the devices of each set being adapted for alternate energization in accordance with the position of the associated contact-carrying member as said master controller is momentarily operated to a certain position, and means for thereupon holding in the actuated device until the corresponding contact-carrying members occupy predetermined positions, whereby substantially identical operation of the several liquid rheostats is insured.

11. In a system of control, the combination with a plurality of driving members, of independent means for severally governing the operation thereof, and means for effecting different actuations of each governing means during the operating range thereof and for effecting identical actuations of all said governing means, under certain conditions.

12. In a system of control, the combination with a plurality of dynamo-electric machines, of resistance-varying means for normally independently governing the operation thereof, means for controlling said resistance-varying means, and means for effecting different actuations of said controlling means during the operating range thereof and for effecting identical actuations of all said controlling means, under certain conditions.

13. In a system of control, the combination with a plurality of dynamo-electric machines, of resistance-varying means for normally independently governing the operation thereof, movable means for severally controlling said resistance-varying means, a controlling device for effecting operation of all said machines, and means severally electrically associated with said controlling device and mechanically operable with the respective movable means for effecting different degrees of movement of each movable means during the operating range thereof and for effecting identical movements of all said movable means, under certain conditions.

14. In a system of control, the combination with a plurality of dynamo-electric machines, of resistance-varying means for normally independently governing the operation thereof, movable means for severally controlling said resistance-varying means, a controlling device for effecting operation of all said machines, and plural means for effecting different degrees of movement of each movable means during the operating range thereof and for effecting identical movements of all said movable means, under certain conditions, said plural means comprising a contact-carrying member operable with each movable means and switching devices interposed between each contact-carrying member and said controlling device.

15. In a system of control, the combination with a plurality of dynamo-electric machines, of resistance-varying means for normally independently governing the operation thereof, electrically-controlled means for severally governing said resistance-varying means, a controlling device for effecting operation of all said machines, a plurality of contact-carrying members movable with the respective electrically-controlled means for effecting different degrees of movement of each resistance-varying means during the operating range thereof, and a plurality of switching devices adapted to be intermittently energized in accordance with the position of the corresponding contact-carrying member.

16. In a system of control, the combination with a plurality of driving induction motors, of a plurality of liquid rheostats for normally independently governing the operation thereof, electrically-controlled means for severally governing said liquid rheostats, a master controller for effecting operation of all said motors, a plurality of contact-carrying members movable with the respective electrically-controlled means for effecting different degrees of movement of each resistance-varying means during the operating range thereof, a plurality of sets of switching devices corresponding to the contact-carrying members, the devices of each set being adapted for alternate energization in accordance with the position of the associated contact-carrying member as said master controller is momentarily operated to a certain position, and means for thereupon holding in the actuated devices until the corresponding contact-carrying members occupy predetermined positions, whereby substantially identical operation of the several resistance-varying means is insured.

17. In a system of control, the combination with a plurality of driving induction motors, of a plurality of liquid rheostats for normally independently governing the operation thereof, electrically-controlled means for severally governing said liquid rheostats, a master controller for effecting operation of all said motors, a plurality of contact-carrying members movable with the respective electrically-controlled means, means for effecting a greater movement of said resistance-varying means with respect to said electrically-controlled means under certain operating conditions than under others, and a plurality of switching devices adapted to be intermittently energized in accordance with the position of the corresponding contact-carrying member.

18. In a system of control, the combination with a plurality of driving induction motors, of a plurality of liquid rheostats severally having valve members for normally independently governing the operation of said motors, electrically-controlled rotatable means for each rheostat embodying a conically-shaped drum, a cable having a plurality of convolutions disposed around said drum and having its ends respectively weighted and attached to the corresponding valve member, a plurality of contact-carrying drums rotatable with the conically-shaped drums, a master controller for effecting operation of all said motors, a plurality of sets of switching devices corresponding to the contact-carrying members, the devices of each set being adapted for alternate energization in accordance with the position of the associated contact-carrying drum as said master controller is momentarily operated to a certain position, and means for thereupon holding in the actuated devices until the corresponding contact-carrying drums occupy predetermined positions.

In testimony whereof, I have hereunto subscribed my name this 25th day of August, 1916.

FRANCIS H. SHEPARD.

Copies of this patent may be obtained for five cents each, by addressing the "Commissioner of Patents, Washington, D. C."